INVENTORS
SHMUEL STERNBERG
HARRIS J. BIXLER

BY *Andrew F. Kehoe*

ATTORNEY

United States Patent Office 3,598,728
Patented Aug. 10, 1971

3,598,728
MEMBRANE-MODERATED SEPARATION APPARATUS AND PROCESS
Harris J. Bixler, Lexington, and Shmuel Sternberg, Hyde Park, Mass., assignors to Amicon Corporation, Lexington, Mass.
Filed June 16, 1969, Ser. No. 833,419
Int. Cl. B01d *13/00, 31/00*
U.S. Cl. 210—22                                    17 Claims

ABSTRACT OF THE DISCLOSURE

A novel separative apparatus comprising a separation zone whereby (1) an immobilized liquid phase is separated from a mobile liquid phase by a semi-permeable membrane and wherein said mobile liquid phase is a carrier liquid for a plurality of compounds, at least one of which compounds interacts, chemically or physically, with the semi-permeable membrane and/or the immobilized liquid phase and is thereby retarded in its progress through the reaction zone.

BACKGROUND OF THE INVENTION

This invention relates to improved process and apparatus for carrying out separations of chemical compounds, for example to facilitate the analysis of mixtures comprising the compounds.

Heretofore, separations of the type generally described have been carried out by chromatographic processes, e.g. gel permeation chromatographic (GPC) processes. In a typical GPC process, small spherical particles of cross-linked polymeric material are packed into a cylindrical column. A carrier fluid which swells the particulate packing material is passed through the column and, after the column packing has been equilibrated with this fluid, a sample containing a mixture of molecules to be separated is injected into the stream of carrier fluid. Usually the cross-link density of the packing material is adjusted so that molecules to be separated permeate at different rates from the carrier fluid into the packing material. These various rates are dependent upon the size, shape, or other characteristics of the various kinds of molecules. In some other GPC processing techniques porous inert particulate substances like glass beads must be laboriously prepared to function as a separating media.

Separation is effected by the difference in rates of permeation into the packing material from the relatively sample-rich portion of the carrier fluid stream and the subsequent difference in rates of permeation out of the packing into a sample-lean carrier stream. Ideally, and by repeated interchange between the packing and the external phase, the position of each component present in a sample becomes different with respect to each other component. Materials having low permeability in the column packing move through the column more rapidly than those with a high permeability in the packing material.

Obviously the use of particulate material of the type described has certain limitations with respect to the geometrical configuration of devices and such particles.

SUMMARY OF THE INVENTION

Therefore, it is an object of the invention to provide novel and improved apparatus for carrying out separative processes of the type described above.

Another object of the invention is the provision of an apparatus for carrying out molecular-scale separations utilizing an organic polymeric sheet material as the organic polymer at the interface between mobile carrier fluid and a stationary liquid phase.

Another object of the invention is to provide a novel process for effecting separations.

Other objects will be obvious to those skilled in the art on reading the instant specification.

The above objects have been substantially accomplished by the construction and use of an apparatus comprising a separation chamber which contains a first fluid zone for holding a stationary fluid and a second fluid zone for conducting a flowing carrier fluid therethrough. An organic, polymeric, semi-permeable membrane is arranged to provide a differentiating barrier wall between the two fluid zones.

Separation of mixtures of chemicals which are carried out on the above-described apparatus would depend on such factors as the permselectivity of the anisotropic membrane, the phase-volume ratio of the stationary liquid phase relative to the mobile liquid phase, and flow rate of the mobile liquid phase passing through the column. The permselectivity of the membrane could be controlled by a number of factors including the chemical nature of the polymer from which the membrane is formed and/or the quantitative and qualitative nature of any porosity in the membrane surface. In general, the more advantageous membranes for use in macromolecular separations are those anisotropic membranes of the type sold under the trade designation Diaflo by Amicon Corporation of Lexington, Massachusetts. By macromolecular is meant those molecules consisting of at least about 250 atoms and which would not be able to permeate a membrane having only an average pore size of 10-angstrom diameter.

However, in other applications—for example those wherein compositions containing smaller molecular or ionic species are being subject to separation or analysis, membranes having effective pore sizes below 10 angstroms and membranes which are substantially pore-free may also be utilized. In either case, anisotropic membranes, i.e. those comprising a relatively thin barrier skin up to a few microns thick and a relatively porous substrate are the best membranes for use in the apparatus and process of the invention.

The immobile liquid phase is immobile in the relative sense, it is not intended by use of the terminology to exclude apparatus which provides in one way or another for a mixing action when such an action, is for some reason, desirable. More often, however, such action will not be desirable and, to the contrary, it may prove more advantageous to isolate various sections of the immobile liquid phase to minimize mixing action within this phase. In practice, there is no substantial pressure differential across the membrane wall separating the fluid zones.

The mobile liquid phase is preferably contained in a thin chamber, most advantageously less than about 0.030 inch thick, with at least one wall of the chamber being formed of the membrane.

A particular advantage of the apparatus is that stationary and mobile liquid phases having compositions which are immiscible one with the other may be utilized. For example, the stationary phase can be a non-polar liquid like a hydrocarbon and the mobile phase could be a polar liquid such as an aqueous or alcoholic liquid.

Another interesting variation in design of the apparatus of the invention is to have the membrane barrier layer comprise a graded or varying porosity along the length thereof.

One embodiment of the invention which is particularly economical of space is that wherein the immobile liquid phase is contained within the macroporous substrate of an anisotropic membrane. Two anisotropic membranes can be assembled back-to-back and sealed around the edges thereof to provide an especially compact first fluid zone. When such membrane assembly is rolled into a spiral configuration and properly spaced to provide a zone for the movement of the composition being subject to separation, a highly desirable compact device results.

As will be evident in view of the above disclosure, tubular anisotropic membranes can be used to advantage in the apparatus and process of the invention. In such use, it is preferable that the barrier skin be on the inside of the tube and that it be through the tube that the carrier fluid flows. However, operable devices may be prepared from membranes with the skin side out if, for some reason, this is preferable in a given application.

Such tubular anisotropic membranes can be obtained from Amicon Corporation under the trade designation Diaflo.

ILLUSTRATIVE EMBODIMENTS OF THE INVENTION

In this application and accompanying drawing we have shown and described a preferred embodiment of our invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited to the condition of a particular case.

IN THE DRAWINGS

Figure 1:
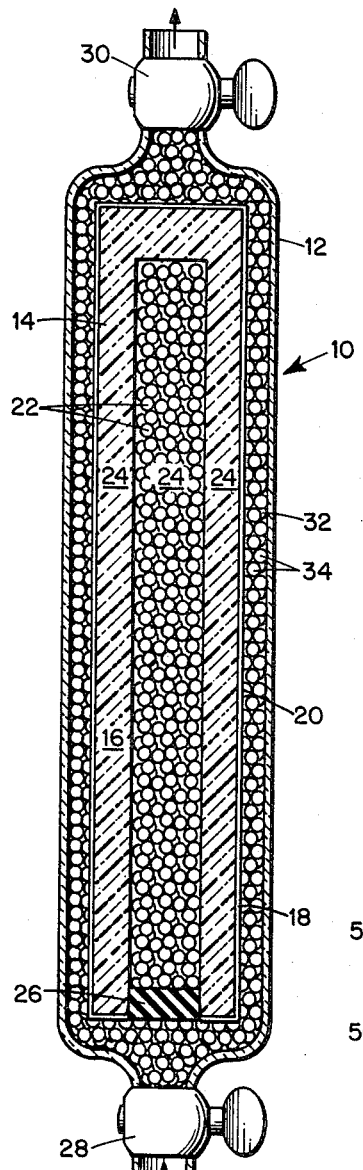
FIG. 1 shows a diagrammatic section of an apparatus constructed according to the instant invention.

Referring to FIG. 1, there is seen a separation apparatus 10 formed primarily of an outer cylinder 12, and an inner cylinder 14. Cylinder 14 is formed of an inert, porous, sintered polypropylene support means 16 upon which is supported an anisotropic membrane 18. Membrane 18 is arranged with a thin macroporous barrier layer of about 4 microns facing the outer side 20 thereof, i.e. away from support 16. Glass beads 22 are used to give mechanical support to the support 16 and also to help immobilize a liquid which is maintained in the zone 24, i.e. the zone within membrane 18 itself. A plug 26 is used to hold the glass beads in place.

Outer cylinder 12 is equipped with an inlet port 28 and an outlet port 30. Cylinder 12 forms, with cylinder 14, a thin annular passage 32 which is packed with glass beads 34.

In a demonstrative operation, the inner zone 24 is rinsed and filled with a phosphate buffered saline solution of the type well known in the biochemical art, and this solution is passed through inlet port 28, annular passage 32, and outlet port 30 to rinse the system.

Figure 2:
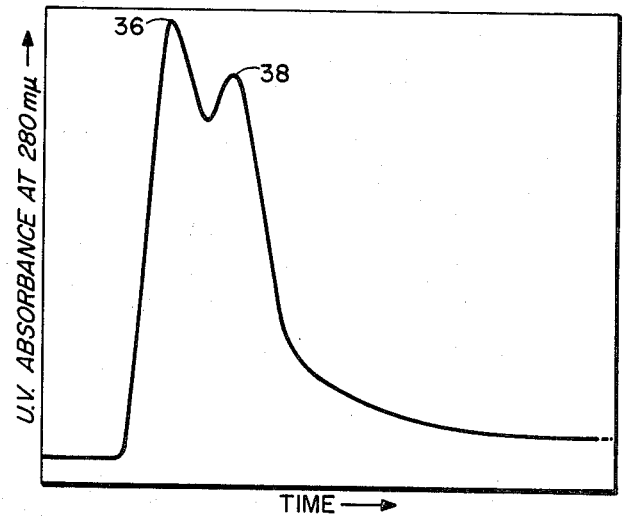
FIG. 2 shows a graph with absorbance measured at 280-millimicron wave length (UV) as the ordinate scale and the chart speed (time) as the abscissa. The chart speed was one inch per hour.

Then a 5% solution of bovine serum albumin in the aforesaid phosphate buffer solution, which solution is known to contain low molecular weight stabilizers, is passed through the annular zone 32 at a rate of about 12 ml. per hour. After leaving outlet port 30, the liquid was conveyed into a Beckman Model 130 spectrometer and, therein, the ultraviolet absorbance of the stream was determined at 280 mμ. The results of this analysis are seen in the graph of FIG. 2. This first peak 36 is of the albumin, the second peak 38 of the low molecular weight stabilizers.

The membrane used in the above work was of the same general characteristics as that membrane available under the trade designation Diaflo XM–50 sold by Amicon Corportion of Lexington, Mass.

Figure 4:
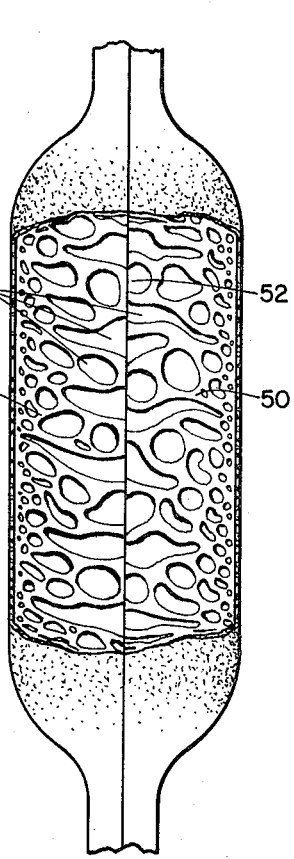
FIG. 4 is a diagrammatic section of a segment of an element comprising two membranes arranged back-to-back to provide a common zone for holding immobilized liquid.
Figure 3:
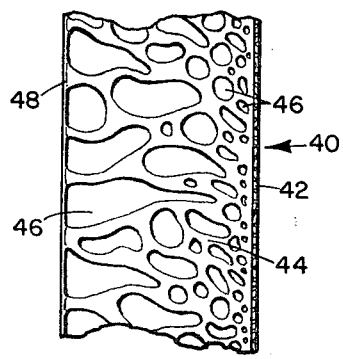
FIG. 3 is a diagrammatic section of a segment of an anisotropic membrane of the type capable of forming both the membrane wall and immobile fluid zone of the present invention.

FIG. 3 is a schematic section of an anisotropic membrane which has been modified so that it may contain therein an immobile liquid, i.e. contain within its structure not only the effective membrane wall but also the zone containing the immobile liquid Referring to FIG. 3, there is seen a membrane segment 40 consisting of a thin barrier skin 42 comprising micropores of about 40 angstroms, a relatively porous substrate 44 comprising macropores 46 which taken together form a suitable zone for holding the immobilized liquid layer. The barrier wall 48 at the rear of the membrane is achieved by lamination of a separate strip on the membrane or by fusing, by heat or solvent, to form a wall at the rear of the membrane. In FIG. 4, a section of an element formed of two anisotropic membranes 50 is shown sealed along their edges in back-to-back relation. This avoids the necessity of a back wall, the macropores 51 of each membrane form a common zone 52 holding the immobilized liquid phase.

Figure 5:
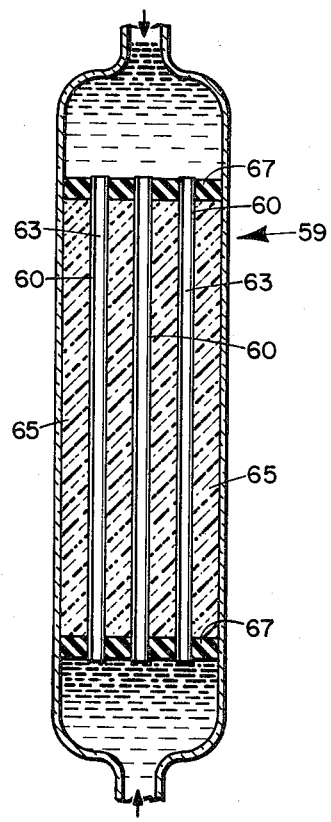
FIG. 5 is a diagrammatic view, partially in section, which illustrates operation of a device using tubular anisotropic membranes.

Referring to FIG. 5, it is seen diagrammatically that a device 59 useful in the process of the invention comprises a plurality of tubular anisotropic membranes 60 arranged in parallel. Each membrane comprises a passage or zone 63 through which fluid carrying a component to be separated is passed. A zone 65 for holding the immobilized liquid is isolated from the zones 63 by the membranes 60 and membrane supporting seal members 67.

Various other advantages and modifications will be apparent to those skilled in the art and fall within the scope of the appended claims. For example, the tubular membranes can be readily heat sealed to form closed tubes which can enclose the zone holding the immobile liquid.

We claim:

1. Apparatus for effecting separation of a mixture of chemical components in a liquid stream, said apparatus comprising structure defining a first fluid zone for containing a stationary liquid, conduit means defining a second fluid zone for transporting said liquid stream containing said chemical components therein past said first fluid zone, a semi-permeable membrane wall mounted between said first and second fluid zones and in contact with said stream to cause chemical components in said stream to have different rates of transfer through said second fluid zone, and outlet means for receiving said liquid stream from said second fluid zone with said chemical components at least partially separated from one another along said stream in accordance with said different rates of transfer.

2. Apparatus as defined in claim 1 wherein said semipermeable membrane is an anisotropic membrane comprising a barrier layer which is substantially free of pores of more than about 10 angstroms in effective diameter.

3. Apparatus as defined in claim 1 wherein the membrane wall comprises sections of varying porosity along the length thereof.

4. Apparatus as defined in claim 1 wherein said structure defining said first fluid zone comprises a membrane support means which is an inert packing material.

5. Apparatus as defined in claim 1 wherein said first zone comprises a membrane support means formed of inert porous cellular material.

6. Apparatus as defined in claim 1 wherein said first fluid zone comprises a number of fluid sub-compartments.

7. Apparatus as defined in claim 1 wherein said second fluid zone includes an inert packing material.

8. Apparatus as defined in claim 1 wherein said second fluid zone is defined in the inside walls of a plurality of tubular anisotropic membranes and said first fluid zone is at the exterior of said anisotropic membranes, the barrier layers of said tubular anisotropic membranes being on the outside thereof.

9. Apparatus as defined in claim 1 wherein said first fluid zone is at the exterior of a plurality of tubular anisotropic membranes and said second zone is formed by the inside walls of said plurality of anisotropic membranes, the barrier layers of said tubular anisotropic membranes being on the inside thereof.

10. Apparatus as defined in claim 1 wherein said membrane wall comprises the thin barrier layer of an anisotropic membrane and said structure defining said first fluid zone comprises the macroporous substructure of said anisotropic membrane.

11. Apparatus as defined in claim 10 wherein said structure defining said first fluid zone comprises the macroporous substructure of two said anisotropic membranes joined together with the macroporous portions thereof juxtaposed to and contacting one another, said membranes being heat sealed around the perimeters thereof.

12. Apparatus as defined in claim 1 wherein said semipermeable membrane is an anisotropic membrane comprising a barrier layer which comprises pores having an effective average diameter of greater than 10 angstroms.

13. Apparatus as defined in claim 12 wherein said structure defining said first fluid zone comprises an inert porous membrane support means and wherein said second fluid zone comprises a chamber having a depth of less than about 0.030 inch adjacent said membrane wall.

14. A process for effecting a separation of a mixture of chemical components in a liquid stream comprising the steps of (1) causing said stream to flow along the face of an anisotropic membrane of the type having a thin barrier layer and a macroporous support integral therewith, (2) maintaining an immobilized liquid on the opposite side of the barrier layer, to which immobilized liquid, at least one component in the composition has access through the barrier layer, thereby modifying the rate of transfer of any said component in the direction along the face of said barrier layer, and (3) collecting said stream at a point past said barrier layer with said chemical components at least partially separated from one another along said stream.

15. A process as defined in claim 14 wherein said membrane is an anisotropic membrane having an average pore size of at least 10 angstroms and wherein said pore size is selected to control the rate of passage of at least one selected component through the membrane barrier layer.

16. A process as defined in claim 14 wherein there is no substantial pressure differential across said barrier layer.

17. A process as defined in claim 14 wherein the immobilized liquid is substantially confined to the macroporous substrate of said anisotropic membrane.

References Cited

UNITED STATES PATENTS

| | | | |
|---|---|---|---|
| 1,777,057 | 9/1930 | Urbain | 210—321 |
| 3,228,876 | 1/1966 | Mahon | 210—321X |
| 3,312,349 | 4/1967 | Rosaen | 210—315X |
| 3,442,389 | 5/1969 | Mendelson | 210—491X |
| 3,459,176 | 8/1969 | Leonard | 210—321X |
| 3,488,768 | 1/1970 | Rigopulos | 210—23 |

FRANK A. SPEAR, JR., Primary Examiner

U.S. Cl. X.R.

210—321